United States Patent
Dotan et al.

(10) Patent No.: US 9,282,114 B1
(45) Date of Patent: Mar. 8, 2016

(54) GENERATION OF ALERTS IN AN EVENT MANAGEMENT SYSTEM BASED UPON RISK

(75) Inventors: Yedidya Dotan, Tel Aviv (IL); Lawrence N. Friedman, Arlington, MA (US); Manoj Nair, Somerville, MA (US); Riaz Zolfonoon, Concord, MA (US)

(73) Assignee: EMC Corporation, Hopkinton, MA (US)

(*) Notice: Subject to any disclaimer, the term of this patent is extended or adjusted under 35 U.S.C. 154(b) by 594 days.

(21) Appl. No.: 13/172,999

(22) Filed: Jun. 30, 2011

(51) Int. Cl.
G06F 21/55 (2013.01)
H04L 9/00 (2006.01)
H04L 29/06 (2006.01)

(52) U.S. Cl.
CPC .......... *H04L 63/1441* (2013.01); *G06F 21/552* (2013.01); *G06F 21/554* (2013.01); *H04L 63/1416* (2013.01)

(58) Field of Classification Search
CPC ... G06F 21/552; G06F 21/577; G06F 21/554; H04L 63/1416; H04L 63/1441
USPC ...................................................... 726/23, 25
See application file for complete search history.

(56) References Cited

U.S. PATENT DOCUMENTS

| 7,412,721 | B2 * | 8/2008 | Torii et al. ....................... 726/22 |
| 7,848,746 | B2 | 12/2010 | Juels |
| 7,911,346 | B1 | 3/2011 | Claudatos et al. |
| 2004/0172535 | A1 | 9/2004 | Jakobsson et al. |
| 2005/0097320 | A1 * | 5/2005 | Golan et al. ................... 713/166 |
| 2006/0256961 | A1 | 11/2006 | Brainard et al. |
| 2006/0282660 | A1 * | 12/2006 | Varghese et al. .............. 713/155 |
| 2007/0143851 | A1 * | 6/2007 | Nicodemus et al. ............ 726/25 |
| 2008/0222706 | A1 * | 9/2008 | Renaud ............... H04L 63/1408 726/4 |
| 2010/0125912 | A1 * | 5/2010 | Greenshpon et al. .......... 726/25 |
| 2012/0030757 | A1 * | 2/2012 | Baikalov et al. ................ 726/22 |

* cited by examiner

*Primary Examiner* — Theodore C Parsons
(74) *Attorney, Agent, or Firm* — BainwoodHuang

(57) ABSTRACT

Embodiments relate to the generation of alerts in an event management system based upon risk. When an event device associated with the event management system, presents a logon page to a client device, the event device includes a beacon as part of the page to monitor and collect web device profile characteristics related to the client device. In response to a logon attempt by the client device, an event management device receives a notification regarding logon attempt and a risk assessment associated with the web device profile characteristics of the client device. Based upon a correlation of the notification and the corresponding risk assessment, the event management device can generate an alert, such as a SIEM alert, and can include an indication of priority, whether relatively low or high, and/or a confidence factor, whether or not the alert can be suppressed as part of the alert.

23 Claims, 4 Drawing Sheets

GENERATION OF ALERTS IN AN EVENT MANAGEMENT SYSTEM BASED UPON RISK

BACKGROUND

A typical corporate enterprise utilizes the Internet to communicate with customers and vendors, to conduct research, and to perform various other tasks. The organization also creates and maintains confidential and proprietary information, such as financial data, personal information, confidential documents, intellectual property, and customer lists as part of the usual course of business. Theft of proprietary information is one of the most costly security problems facing enterprises today. For example, theft of financial data, customer lists, and intellectual property can impact revenues, increase legal costs, and erode long-term competitive advantages for an enterprise.

Conventional enterprises typically utilize a variety of security platforms to provide security controls with respect to information controlled by the enterprise. For example, certain security information and event management (SIEM) platforms, such as the RSA enVision® platform produced by EMC Corporation, Hopkinton, Mass., are configured to collect event or log data, such as security related events or authentication events, generated by event sources, such as servers, routers, and switches present on an enterprise's network. As the security platform collects the event log data, the security platform stores the event data as part of an Internet Protocol Database (IPDB). Based upon the event data stored in the IPDB, an administrator can query the security platform and retrieve data reports regarding network, file, application, and user activity tailored to a variety of compliance requirements. Additionally, based upon the log data stored in the IPDB, the security platform can provide the administrator with security event alerts that allow the administrator to see security threats and risks in real time and to take effective actions to mitigate those threats and risks.

SUMMARY

A common challenge with real-time alerts in relatively large network environments involves the prioritization of the event alerts. For example, in typical enterprise networks, conventional security platforms provide an administrator with security event alerts that allow the administrator to take effective actions to mitigate potential threats and risks. However, conventional event alerts do not provide the administrator with context for reliable prioritization. Accordingly, in cases where the security platforms provide a relatively large volume of event alerts to the administrator, critical events do not necessarily stand out to the administrator as being relatively more important than other events included as part of the event alerts. In such a case, the administrator can fail to properly address certain critical events in a time effective manner.

By contrast to conventional alerting systems, embodiments of the present innovation relate to the generation of alerts in an event management system based upon risk. For example, when an event device associated with the event management system, such as an authentication device, presents a logon page, such as an authentication page, to a client device, the event device includes a beacon as part of the page to monitor and collect web device profile characteristics, such as geographic location data, related to the client device. In response to an authentication attempt by the client device, an event management device receives a notification regarding the authentication attempt and a risk assessment associated with the web device profile characteristics of the client device. Based upon a correlation of the authentication attempt notification and the corresponding risk assessment, the event management device can generate an alert, such as a SIEM alert, and can include an indication of priority, whether relatively low or high, and/or a confidence factor, whether or not the alert can be suppressed as part of the alert. Accordingly, by prioritizing the alerts based upon risk, the event management system provides an administrator with notification as to the relative importance of a security risk to a network.

In one arrangement, embodiments or the innovation relate to a method for generating alerts by an event management device. The method includes receiving, by the event management device, logon event information from an event device in response to a logon event associated between the event device and a client device. The method includes receiving, by the event management device, a risk assessment from a risk assessment device, the risk assessment based upon a web device profile characteristic associated with the logon event. The method includes correlating, by the event management device, the logon event information and the risk assessment. The method includes in response to detecting the logon event as corresponding to an authentication attack, generating, by the event management device, an alert having an associated priority level based upon the risk assessment.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present innovation relate to the generation of alerts in an event management system based upon risk. For example, when an event device associated with the event management system, such as an authentication device, presents a logon page, such as an authentication page, to a client device, the event device includes a beacon as part of the page to monitor and collect web device profile characteristics, such as geographic location data, related to the client device. In response to an authentication attempt by the client device, an event management device receives a notification regarding the authentication attempt and a risk assessment associated with the web device profile characteristics of the client device. Based upon a correlation of the authentication attempt notification and the corresponding risk assessment, the event management device can generate an alert, such as a SIEM alert, and can include an indication of priority, whether relatively low or high, and/or a confidence factor, whether or not the alert can be suppressed. Accordingly, by prioritizing the alerts based upon risk, the event management system provides an administrator with notification as to the relative importance of a security risk to a network.

Figure 1:
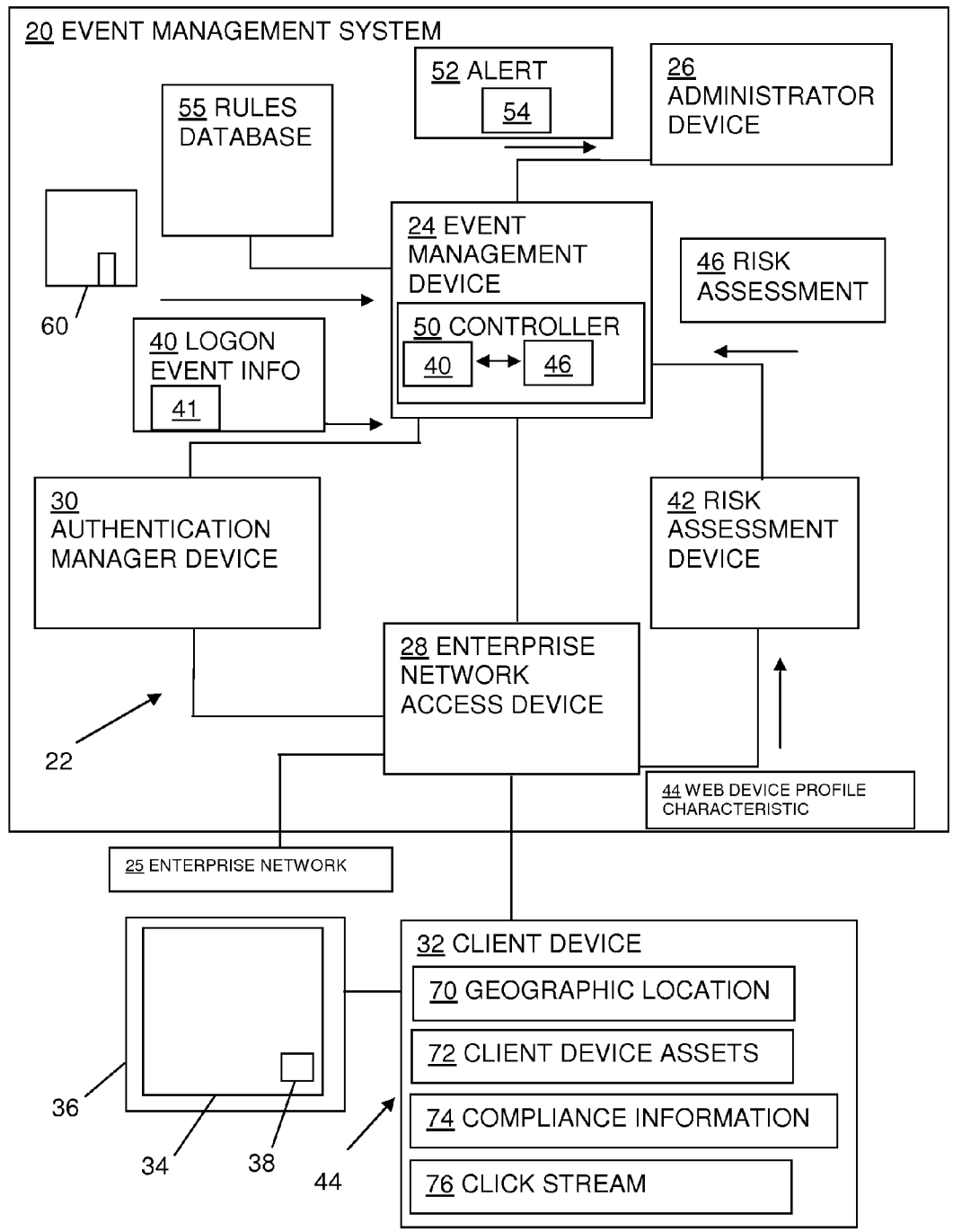
FIG. 1 illustrates a schematic representation of an event management system associated with an enterprise network, according to one embodiment.

FIG. 1 illustrates an example arrangement of an event management system 20, such as used by an enterprise. As shown, the event management system 20 includes a set of event sources or logon devices, collectively 22, an event management device 24, and an administrator device 26. The event management system 20, in one arrangement, operates in conjunction with a network 25, such as a local area network (LAN) or a wide area network (WAN) associated with the enterprise.

The event sources 22, such as servers, routers, and switches, are configured to generate event data or event log messages in response to logon or authentication events. For example, in the arrangement illustrated, the event sources 22 include an enterprise network access device 28 and an authentication manager device 30.

The enterprise network access device 28 is configured as a front end server or policy enforcement point for the enterprise network 25. In one arrangement, the enterprise network access device 28 is configured to provide a client device 32, such as a computerized device, with a logon or authentication webpage 34 on behalf of the authentication manager device 30. For example, the enterprise network access device 28 provides the client device 32 with an authentication webpage 34 for display by a browser via a monitor 36 disposed in electrical communication with the client device 32. The authentication webpage 34 provides the client device 32 with a request for a username and a corresponding token to authenticate the client device 32 to the event management system 20 and to establish a secured connection between the enterprise network 25 and the client device 32.

The authentication webpage 34 also includes a beacon 38. The beacon 38 is a software entity associated with the webpage 34 which is configured to monitor and collect information, termed web device profile characteristics 44, regarding various aspects of a webpage session as undertaken by the client device 32. For example, the beacon 38 can be configured to collect web device profile characteristics relating to the type of browser utilized by the client device 32 or the geographic location of the client device 32, such as based upon a network address. As will be described below, in response to the client device 32 accessing the authentication webpage 34, the beacon 38 associated with the webpage retrieves the web device profile characteristics regarding the client device 32 and forwards the web device profile characteristics 44 to a risk assessment device 42, such as a server executing a servlet engine, for further processing.

The authentication manager device 30 is configured to authenticate the client device 32 to the enterprise network 25 and to generate logon event information 40, such as event data, for the event management device 24 in response to the client device 32 attempting to execute a logon procedure with respect to the authentication webpage 34. In one arrangement, when the client device 32 attempts to authenticate itself to the authentication manager device 30, the authentication manager device 30 generates event data 40 related to the attempted authentication process. For example, the authentication manager device 30 collects various information associated with the client device 32, such as the name of the user associated with the client device 32, a network address associated with the client device 32, and a timestamp associated with the authentication attempt. The authentication manager device 30 includes this information 41 as part of the event data 40 and forwards the event data 40 to the event management device 24 for further processing, as will be described in detail below.

The risk assessment device 42 is configured to receive a web device profile characteristic 44 as collected by the beacon 38 associated with the authentication page 34. Based upon a predefined risk model, the risk assessment device 42 is configured to calculate a risk associated with the authentication attempt as provided by the client device 32 and to generate a corresponding risk assessment 46. The risk assessment device 42 is further configured to forward the risk assessment 46 to the event management device 24 via the event management system 20. While the risk assessment 46 can be configured a variety of ways, in one arrangement, the risk assessment 46 is configured as a syslog message.

The event management device 24 is disposed in electrical communication with the event sources 22 and the risk assessment device 42. The event management device 24 includes a controller 50 which is configured to collect event data 40 generated by each event source 22, as well as risk assessments 46 generated by the risk assessment device 42 and correlate the event data 40 with the corresponding risk assessment 46. Based upon the correlation, for critical incidents indicative of a potential attack on the enterprise network 25, the event management device 24 is configured to generate a real-time alert 52 with an associated priority level 54 and transmit the alert 52 to the administrator device 26 for further processing. While the event management device 24, can be configured in a variety of ways, in one arrangement, the event management device 24 is configured as an RSA enVision® platform produced by EMC Corporation, Hopkinton, Mass. The RSA enVision platform is a security information and event management (SIEM) platform, which allows security professionals to collect and analyze log and event data via the administrator device 26 to identify high-priority security incidents as they Occur.

Accordingly, the event management device 24 is configured to generate alerts 52 prioritized based upon a risk associated with the client device 32. In one arrangement, the controller 50 stores an alert generation application. The alert generation application installs on the event management device 24 from a computer program product 60. In some arrangements, the computer program product 60 is available in a standard off-the-shelf form such as a shrink wrap package (e.g., CD-ROMs, diskettes, tapes, etc.). In other arrangements, the computer program product 60 is available in a different form, such downloadable online media. When performed on the controller 50 of the event management device 24, the alert generation application causes the event management device 24 to generate a real-time alert 52 with an associated priority level 54 and transmit the alert 52 to the administrator device 26.

Figure 2:
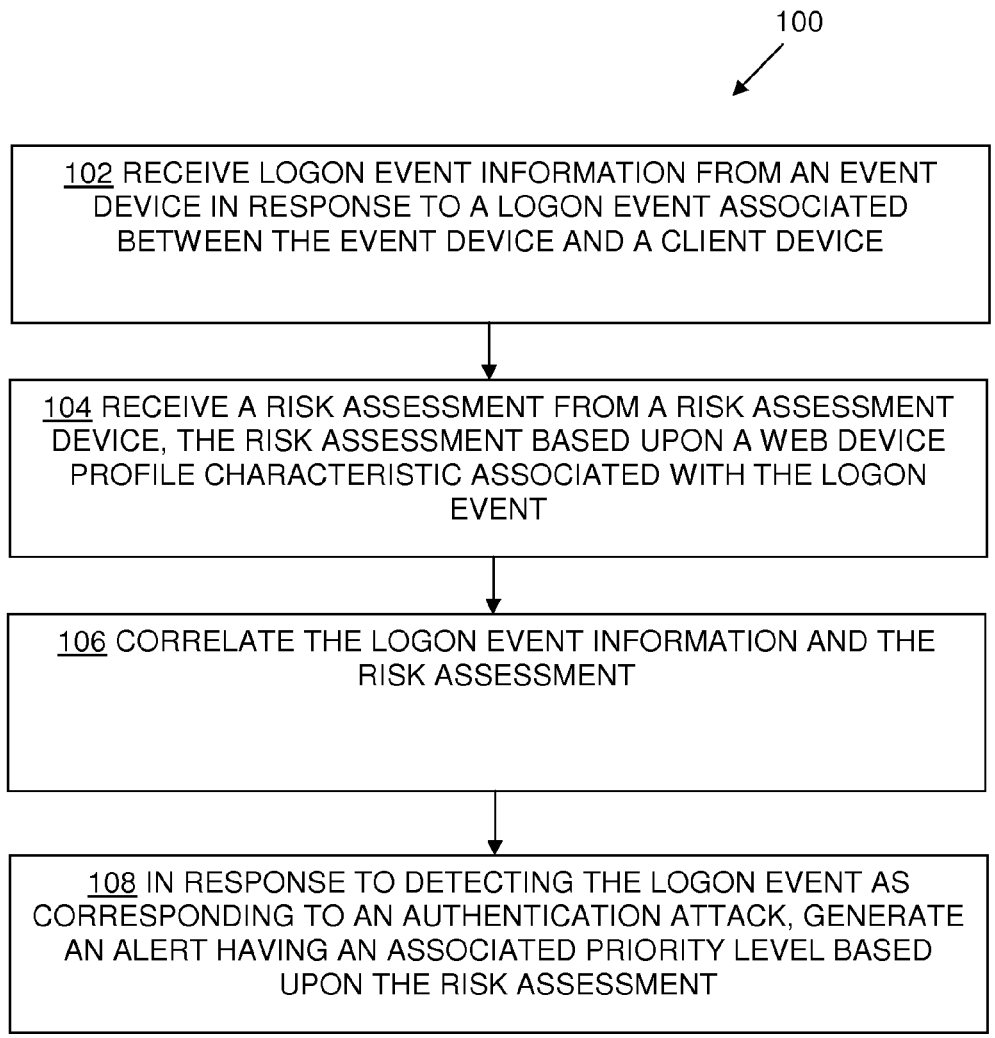
FIG. 2 is a flowchart that illustrates a procedure performed by an event management device of FIG. 1.

Details of an example procedure performed by the event management device 24 are provided as follows with respect to FIG. 2. For example, FIG. 2 illustrates a flowchart 100 of an example procedure performed by the event management device 24 during operation.

In step 102, the event management device 24 receives logon event information 40 from an event device 22 in response to a logon event associated between the event device 22 and a client device 32. For example, with reference to FIG. 1, assume that prior to accessing the enterprise network 25, the client device 32 is required to authenticate itself to the authentication manager device 30. In such a case, the enterprise network access device 28 presents the client device 32 with an authentication webpage 34 originating from the authentication manager device 30. The authentication webpage 34 provides the client device 32 with a request for a username and a corresponding token to authenticate the client device 32 to the event management system 20 and to establish a secured connection, such as a Secure Socket Layer Virtual Private Network (SSL VPN) between the enterprise network 25 and the client device 32.

In response to the client device 32 providing the username and token to the authentication manager device 30 via the enterprise network access device 28, the authentication manager device 30 detects the receipt of the username and token as a logon event, specifically an authentication attempt. The authentication manager device 30, in turn, collects information associated with the authentication attempt, such as the name of the user associated with the client device 32, a network address associated with the client device 32, and a timestamp associated with the authentication attempt. The authentication manager device 30 provides this information as logon event information 40 to the event management device 24.

Returning to FIG. 2, in step 104 the event management device 24 receives a risk assessment 46 from a risk assessment device 42, the risk assessment 46 based upon a web device profile characteristic 44 associated with the logon event. As indicated above and with reference to FIG. 1, the authentication webpage 34 includes a beacon 38 which is configured to collect web device profile characteristics 44 related to the client device 32. While a web device profile characteristic 44 can identify a variety of types of information associated with the client device 32, in the present example, assume that the web device profile characteristic 44 identifies a geographic location 70 associated with the client device 32. Accordingly, in response to the client device 32 initiating the logon event with the authentication manager device 30 by forwarding a username and token to the device 30, the beacon 38 captures the geographic location information 70 stored by the client device 32 and forwards the information 70 to the risk assessment device 42.

After receiving the geographic location information 70, the risk assessment device 46 detects a risk associated with the client device 32 based upon a pre-defined risk model for the geographic location information 70. For example, certain geographic locations have statistically higher-than-typical incidences of generating attacks on enterprise networks than do other geographic locations. The risk assessment device 46, in one arrangement, is configured with this geographic risk model and can detect or calculate the risk assessment 46 based upon a correlation of the geographic location information 70 and the geographic risk model. Accordingly, assume the case where the geographic location information 70 identifies the client device 32 as originating from a location having relatively low incidences of generating attacks on enterprise networks, based upon the geographic risk model. In such a case, the risk assessment device 42 can generate the risk assessment 46 indicating the client device 32 as being a relatively low risk to the enterprise network 25 and forward the risk assessment 46 to the event management device 24. However, assume the case where the geographic location information 70 identifies the client device 32 as originating from a location having relatively high incidences of generating attacks on enterprise networks, based upon the geographic risk model. In such a case, the risk assessment device 42 can generate the risk assessment 46 indicating the client device 32 as being a relatively high risk to the enterprise network 25 and forward the risk assessment 46 to the event management device 24.

Returning to FIG. 2, in step 106 the event management device 24 correlates the logon event information 40 and the risk assessment 46. For example, with reference to FIG. 1, during operation the event management device 24 can receive multiple pieces of event data 40 from a variety of event devices 22 within the event management system 20. Additionally, for every logon event for each event device 22, the event management device 24 receives multiple risk assessments 46 from the risk assessment device 42. Accordingly, the event management device 24 matches each piece of logon event information 40 with a corresponding risk assessment 46. While such matching can be performed in a variety of ways, in one arrangement, the event management device 24 matches each piece of logon event information 40 with a corresponding risk assessment 46, based upon identifiers included in each piece of logon event information 40 and in each risk assessment 46. For example, the identifiers in each element 40, 46 can identify a common device, such as the client device 32, as being the source of the logon event.

Returning to FIG. 2, in step 108 in response to detecting the logon event as corresponding to an authentication attack, the event management device 24 generates an alert 52 having an associated priority level 54 based upon the risk assessment 46. With reference to FIG. 1, prior to transmitting an alert 52, the event management device 24 first detects if the client device 32 that initiated the logon event is attempting to attack the enterprise network 25. As indicated above, the login event information 40 includes information 41 related to the client device 32, such as an Internet Protocol (IP) network address associated with the client device 32. The event management device 24 compares this information 41 (e.g., the IP address of the client device 32) with a list of unsafe IP addresses, such as source IP addresses of enterprise network attacks. In the event that the event management device 24 detects a correspondence between the IP address information 41 and an entry in the rules database 55, the event management device 24 identifies the client device 32 as being unsafe and generates an alert 24 for transmission to the administrator device 26.

Assume the event management device 24 has identified the client device 32 as potentially being the source of an attack on the enterprise network 25. With this assumption, the event management device includes, as part of the alert 52, a priority level 54 based upon the risk assessment 46 received from the risk assessment device 46. In one example, the risk assessment 46 of the geographic location information 70 can indicate the client device 32 as originating from a geographic location that is a relatively high risk to the enterprise network 25. Accordingly, based upon the risk assessment 46, the event management device 24 generates the alert 52 as having a relatively high priority level 54, such as indicated by a particular notice included as part of the alert 52. In another example, the risk assessment 46 of the geographic location information 70 can indicate the client device 32 as originating from a geographic location that is a relatively low risk to the enterprise network 25. Accordingly, based upon the risk assessment 46, the event management device 24 generates the alert 52 as having a relatively low priority level 54 (e.g., the low priority level being lower than the high priority level), such as indicated by a particular notice included as part of the alert 52.

In either case, once generated the event management device 24 transmits the alert 52 to the administrator device 26, and to a system administrator, in real time. Accordingly, the system administrator will have adequate time to attend to the potential attack on the enterprise network 25 based upon the relative importance of the potential attack. Additionally, with the alert 52 having an associated priority level 54, in the event an administrator were to receive a number of alerts 52, the prioritization of the alerts 52 helps the administrator to identify and attend to the most important (i.e. high priority) alerts 52 before attending to the lower priority alerts 52.

Figure 3:
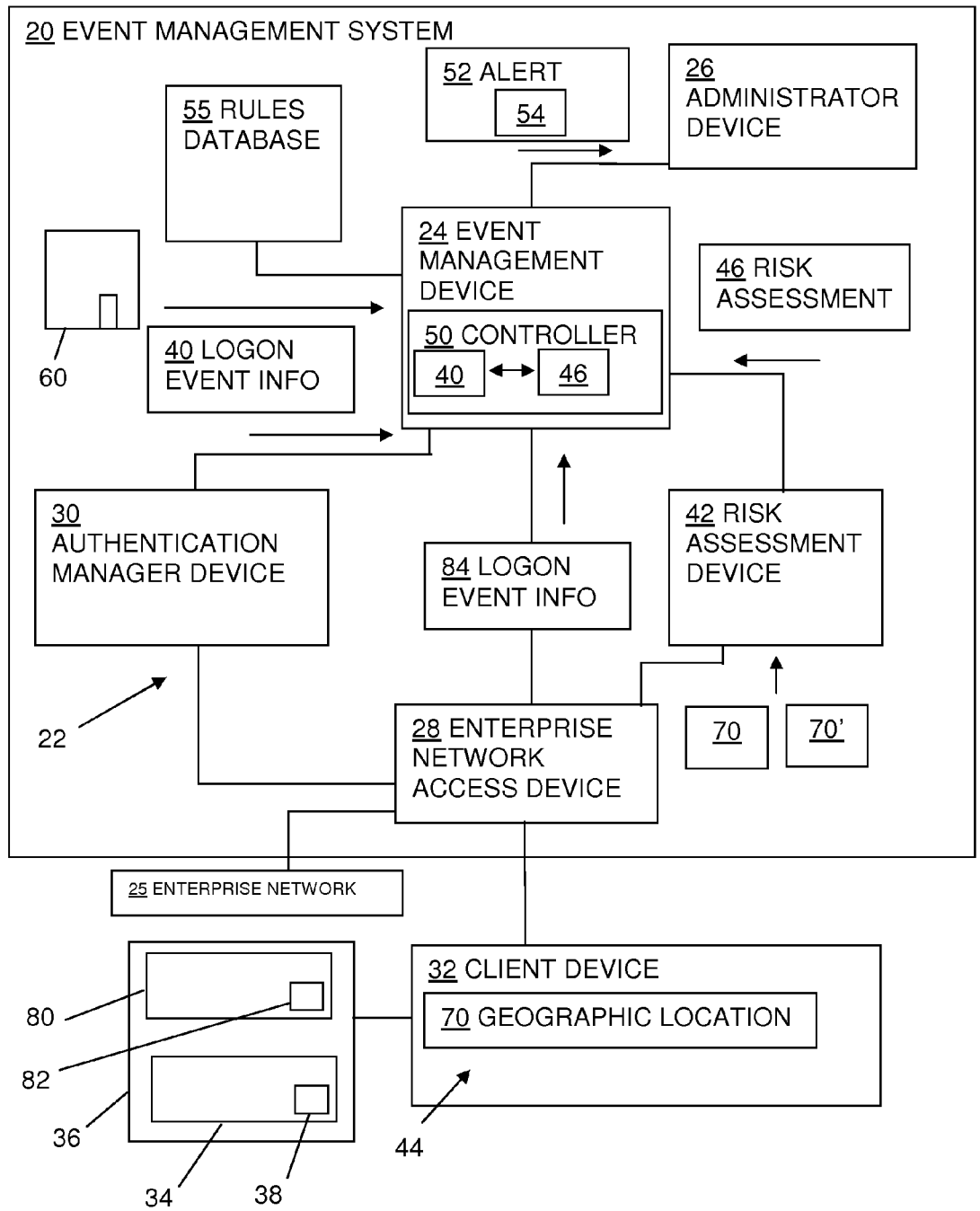
FIG. 3 illustrates a schematic representation of an event management system associated with an enterprise network, according to another embodiment.

As indicated above, the authentication manager device 30 is configured to authenticate the client device 32 to the enterprise network 25 via a logon webpage such as an authentication webpage 34. However, other components of the enterprise network 25 can provide the client device 32 with additional, subsequently generated logon webpages as well. In one arrangement, with reference to FIG. 3, the enterprise network access device 28 is configured to provide a network interface, such as an Outlook Web Access service of the Microsoft Exchange Server 5.0, client devices 32 to allow the client device 32 to access the enterprise network 25 from an offsite location.

For example, following authentication of the client device 32 with the authentication manager device 30, the client device 32 receives a network interface 80 from the enterprise network access device 28 as the logon page. The network interface 80 also includes a beacon 82 configured to collect web device profile characteristics 44 associated with the client device 32, such as geographic location information 70 associated with the client device 32. For example, when the client device 32 provides logon information to the enterprise network access device 28 via the network interface 80, the access device 28, in turn, forwards logon event information 84 to the event management device 24. Additionally, in response to the logon event, the beacon 82 collects the web device profile characteristics 44 and forwards the characteristics 44 to the risk assessment device 42

In certain logon scenarios, between authenticating to the enterprise network 25 and logging into the enterprise network 25, a fraudster can gain access of the client device 32 from a geographically different location to attack the network 25. In such a configuration, because both the first beacon 38 and the second beacon 80 collect geographic location information 70 associated with the client device 32 at different times (i.e., the second beacon 82 operates subsequent to the first beacon 38), the risk assessment device 42 can utilize the separately collected geographic location information 70 to detect changes in the geographic location associated with the client device 32 to detect potential attacks on the enterprise network 25.

For example, assume the case where the risk assessment device 42 receives a first geographic location identifier 70 associated with the client device 32 when the client device 32 authenticates to the authentication manager device 30 during a first logon event. Further assume the case where the risk assessment device 42 receives a second geographic location identifier 70' associated with the client device 32 when the client device 32 logs into the enterprise network access device 28 during a second logon event. In response, the risk assessment device 42 compares the first geographic location identifier 70 with the second geographic location identifier 70'. In the case where the identifiers 70, 70' are identical, the risk assessment device 42 can provide a risk assessment 46 to the event management device 24 indicating the client device 32 as being a relatively low risk to the enterprise network 25. However, in the case where the identifiers 70, 70' are different, such as caused by a fraudster gaining control of the client device 32, the risk assessment device 42 can provide a risk assessment 46 to the event management device 24 indicating the client device 32 as being a relatively high risk to the enterprise network 25. In either case, the event management device uses the risk assessment 46 to assign a priority level 54 to any alerts 52 generated.

As indicated above, in one arrangement, the web device profile characteristic 44 is configured as geographic location information 70. However, the web device profile characteristic 44 can be configured to provide other or additional information as well.

With reference to FIG. 1, in one arrangement, the web device profile characteristic 44 is configured as computer device asset information 72. For example, the client device 32 can be configured with certain assets, such as a browser to access the authentication webpage 34 associated with the authentication manager device 30. However, certain assets, such as certain browser versions can include known vulnerabilities that can be compromised by a fraudster as part of an attack in the enterprise network 25. Accordingly, in one arrangement the beacon 38 retrieves client device asset information 72, such as browser version information, from the client device 32 and transmits the information 72 to the risk assessment device 42. The risk assessment device 42, in turn, detects a risk associated with the client device 32 based upon a pre-defined risk model for the asset information.

In the case where the risk assessment device 42 detects the client device asset information 72 as complying with the risk model (e.g., the browser version is up-to-date) the risk assessment device 42 can provide a risk assessment 46 to the event management device 24 indicating the client device 32 as being a relatively low risk to the enterprise network 25. In the case where the risk assessment device 42 detects the client device asset information 72 as being incompliant with the risk model (e.g., the browser version is out of date) the risk assessment device 42 can provide a risk assessment 46 to the event management device 24 indicating the client device 32 as being a relatively high risk to the enterprise network 25. In either case, the event management device uses the risk assessment 46 to assign a priority level 54 to any alerts 52 generated.

With continued reference to FIG. 1, in one arrangement, the web device profile characteristic 44 is configured as compliance information 72. As with the above example, the client device 32 can be configured with a browser to access the authentication webpage 34 associated with the authentication manager device 30. However, the browser may violate certain policies associated with the enterprise network 25. For example, the browser can include known vulnerabilities, contrary to compliance rules or policies established by the enterprise, which can be compromised by a fraudster as part of an attack in the enterprise network 25. Accordingly, in one arrangement the beacon 38 retrieves compliance information 74, such as browser information, from the client device 32 and transmits the information 72 to the risk assessment device 42. The risk assessment device 42, in turn, detects a risk associated with the client device 32 based upon a pre-defined risk model for the compliance information 74.

In the case where the risk assessment device 42 detects compliance information 74 as complying with the risk model (e.g., the browser of the client device is authorized by the enterprise) the risk assessment device 42 can provide a risk assessment 46 to the event management device 24 indicating the client device 32 as being a relatively low risk to the enterprise network 25. In the case where the risk assessment device 42 detects the compliance information 74 as being incompliant with the risk model (e.g., the browser of the client device 32 is unauthorized by the enterprise) the risk assessment device 42 can provide a risk assessment 46 to the event management device 24 indicating the client device 32 as being a relatively high risk to the enterprise network 25. In either case, the event management device uses the risk assessment 46 to assign a priority level 54 to any alerts 52 generated.

With continued reference to FIG. 1, in one arrangement, the web device profile characteristic 44 is configured as click stream information 76. For example, as a user of the client device 32 accesses successive web pages associated with the enterprise network 25, the user successively click on a set of links. Such accessing of successive websites is termed a click stream and can be used by the event management system to monitor a user or client device's behavior. Known or expected click streams for a client device 32, in one arrangement, are stored by the risk assessment device 42 as part of a pre-defined risk model. Accordingly, in use, the beacon 38 retrieves click stream information 76 generated by the client device 32 and transmits the information 72 to the risk assessment device 42. The risk assessment device 42, in turn, detects a risk associated with the client device 32 based upon a correspondence or lack of correspondence between the click stream information 76 and the pre-defined risk model.

In the case where the risk assessment device 42 detects a correspondence between the click stream information 76 and the risk model (e.g., the client device 32 accesses a set of web pages in a known way) the risk assessment device 42 can provide a risk assessment 46 to the event management device 24 indicating the client device 32 as being a relatively low risk to the enterprise network 25. In the case the risk assessment device 42 detects a lack of correspondence between the click stream information 76 and the risk model (e.g., the client device 32 accesses web pages in an unknown or erratic way, indicative of a potential attack on the network 25) the risk assessment device 42 can provide a risk assessment 46 to the event management device 24 indicating the client device 32 as being a relatively high risk to the enterprise network 25. Again, in either case, the event management device uses the risk assessment 46 to assign a priority level 54 to any alerts 52 generated.

While various embodiments of the invention have been particularly shown and described, it will be understood by those skilled in the art that various changes in form and details may be made therein without departing from the spirit and scope of the invention as defined by the appended claims.

Figure 4:
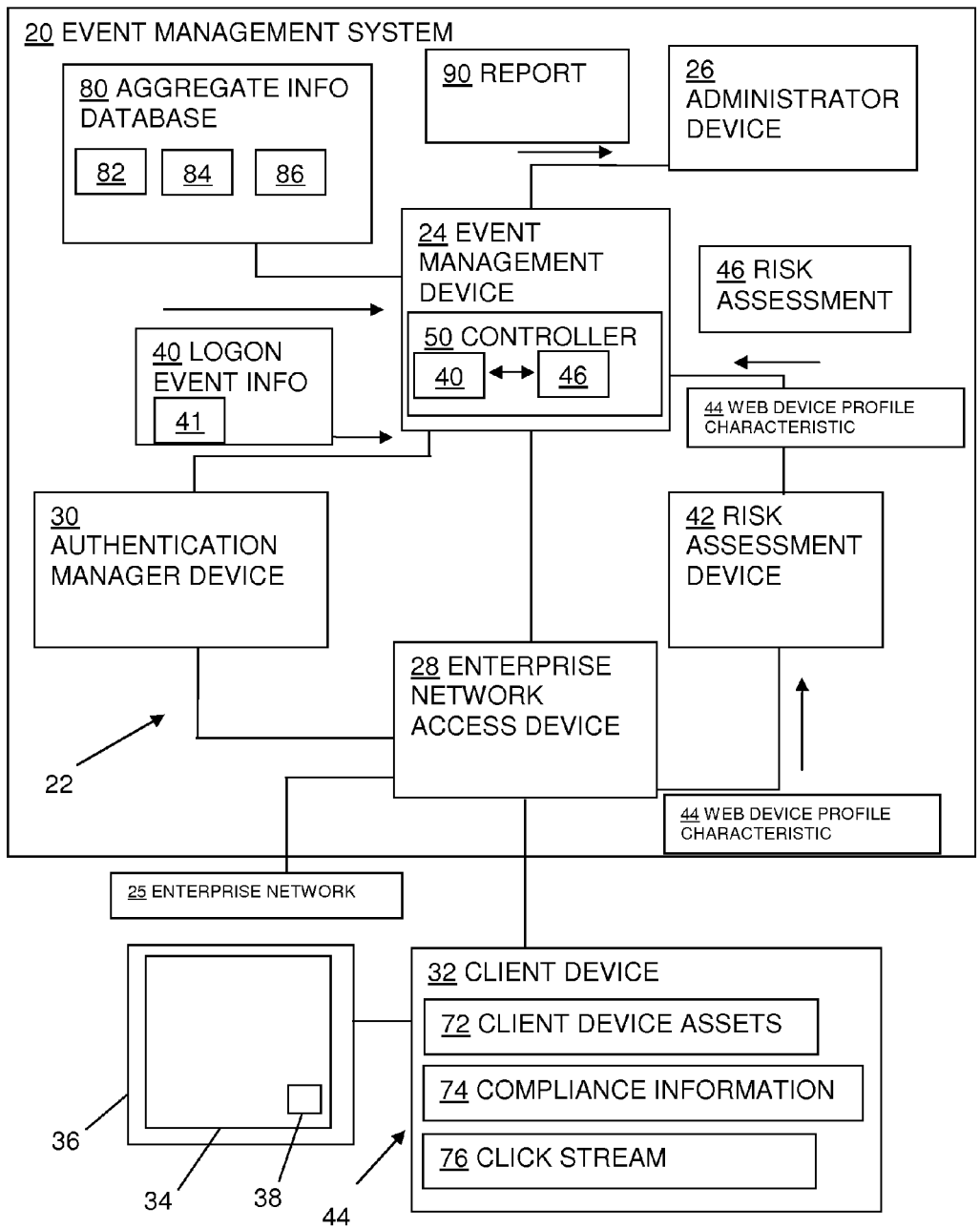
FIG. 4 illustrates a schematic representation of an event management system associated with an enterprise network, according to another embodiment.

For example, as described above, the beacon 38 is a software entity associated with the webpage 34 which is configured to monitor and collect web device profile characteristics 44 regarding various aspects of a webpage session as undertaken by the client device 32. Also as indicated above, as the beacon 38 retrieves web device profile characteristics 44, such as client device asset information 72, compliance information 74, or click stream information 76, and transmits the characteristics 44 to the risk assessment device 42. The risk assessment device 42, in turn, detects a risk associated with the client device 32 based upon a pre-defined risk model for the web device profile characteristics 44 (e.g., a per-transaction risk assessment). Such description is by way of example only. In one arrangement, the event management system 20 is configured to collect the various web device profile characteristics 44 over time and store the web device profile characteristics 44 as part of an aggregate information database 80, as illustrated in FIG. 4.

In one arrangement, the aggregate information database 80 stores aggregate asset information 82 based upon client device asset information 72 received from one or more client devices 32 over time. For example, one or more client devices 32 can attempt to log in to the enterprise network 25 over time. The beacon 38 collects client device asset information 72, such as information relating to the web browser utilized by the client device 32, over time and forwards the client device asset information 72 to the risk assessment device 42. Accordingly, for each attempt, the risk assessment device 42 in one arrangement, forwards the client device asset information 72 to the aggregate information database 80 via the event management device 24. For each piece of client device asset information 72 received, on an ongoing basis, the aggregate information database 80 includes the client device asset information 72 as part of its aggregate asset information 82.

With the aggregate asset information 82 stored as part of the aggregate information database 80, in one arrangement, the event management device 24 can utilize the aggregate asset information 82 to discover the use of either new client device web browsers or old client device web browsers as part of the enterprise network 25. For example, as the event management device 24 receives client device asset information 72, the event management device 24 compares the received client device asset information 72 to the aggregate asset information 82 of the aggregate information database 80. In the case where the event management device 24 does not detect a correspondence between the received client device asset information 72 and the aggregate asset information 82 of the aggregate information database 80, the event management device 24 can detect the originating client device 32 as having a web browser that is new relative to the enterprise network 25. The event management device 24 can, in turn, generate a report 90 to indicate the appearance of a new web browser relative to the enterprise network 25 and provide the report 90 to an administrator, such as via the administrator device 26, for further investigation. This process can be performed in addition to, or exclusive of the event management device 24 generating an alert 52 based upon the detection of a logon event corresponding to an attack.

In another arrangement, the aggregate information database 80 stores aggregate compliance information 84 based upon client device compliance information 74 received from one or more client devices 32 over time. For example, the beacon 38 collects client device compliance information 74, which indicates whether or not the browser of the client device 32 is authorized by the enterprise over time and forwards the client device compliance information 74 to the risk assessment device 42. Accordingly, for each attempt, the risk assessment device 42 in one arrangement, forwards the client device compliance information 74 to the aggregate information database 80 via the event management device 24. For each piece of client device compliance information 74 received, on an ongoing basis, the aggregate information database 80 includes client device compliance information 74 as part of its aggregate compliance information 84.

With the aggregate compliance information 84 stored as part of the aggregate information database 80, in one arrangement, the event management device 24 can utilize the aggregate compliance information 84 to detect and report on policy violation of the client device 32 relative to the enterprise network 25. For example, as the event management device 24 receives client device compliance information 74, such as browser identification information, the event management device 24 compares the received client device compliance information 74 to the aggregate compliance information 84 of the aggregate information database 80. In the case where the event management device 24 does not detect a correspondence between the received client device compliance information 74 and the aggregate compliance information 84 of the aggregate information database 80, the event management device 24 can detect the originating client device 32 as having a web browser that is unauthorized by the enterprise network 25. The event management device 24 can, in turn, generate a report 90 to indicate the client device 32 is configured with an unauthorized browser which is a violation of the enterprise's policies and provide the report 90 to an administrator, such as via the administrator device 26, for further investigation.

In another arrangement, the aggregate information database 80 stores aggregate click stream information 86 based upon client device click stream information 76 received from one or more client devices 32 over time. For example, the beacon 38 collects click stream information 76 which indicates a known set of links that a user successively clicks on to access successive web pages associated with the enterprise network 25. The beacon 38 forwards the click stream information 76 to the risk assessment device 42. Accordingly, the risk assessment device 42 in one arrangement, forwards the click stream information 76 to the aggregate information database 80 via the event management device 24. The aggregate information database 80 stores the click stream information 76 as a known click stream for the client device 32 as part of a click stream information portion 86 of the database 80.

With the aggregate click stream information portion 86 stored as part of the aggregate information database 80, in one arrangement, the event management device 24 can utilize the aggregate click stream information 86 to monitor, track, and report on activity of the client device 32. For example, as the event management device 24 receives client device click stream information 76, such as a set of website access clicks, the event management device 24 compares the received client device click stream information 76 to the known click stream information portion 86 of the database 80. In the case where the event management device 24 does not detect a correspondence between the received client device click stream information 76 and the click stream information portion 86 of the database 80, the event management device 24 can detect the behavior of the originating client device 32 as falling outside of an expected click stream pattern. The event management device 24 can, in turn, generate a report 90 to indicate the client device 32 is behaving unexpectedly and provide the report 90 to an administrator, such as via the administrator device 26, for further investigation.

What is claimed is:

1. A method for generating alerts by an event management device, comprising:
   receiving, by the event management device, a request for access from a client device;
   transmitting, by the event management device and in response to receiving the request, an authentication webpage to the client device, the authentication webpage including a beacon configured to execute on the client device when the webpage is displayed on the client device to retrieve a client device profile characteristic;
   receiving, by the event management device, logon event information from an event device in response to a logon event associated between the event device and the client device, the logon event information including authentication input from the authentication webpage;
   receiving, by the event management device, a risk assessment from a risk assessment device, the risk assessment based upon a web device profile characteristic associated with the logon event, the web device profile characteristic having been gathered by the beacon executing on the client device in the authentication webpage transmitted to the client device;
   correlating, by the event management device, the logon event information and the risk assessment; and
   in response to detecting the logon event as corresponding to an authentication attack, generating, by the event management device, an alert having an associated priority level based upon the risk assessment;
   wherein receiving the risk assessment from the risk assessment device comprises receiving, by the event management device, the risk assessment based upon the web device profile characteristic associated with the logon event, the web device profile characteristic identifying click stream information associated with a web page accessed by the client device, and
   wherein the method further comprises:
   receiving, by the event management device, in response to the request for access to an enterprise network access device from a client device, a first client geographical location based upon the web device profile characteristic associated with the logon event gathered by the beacon executing on the client device;
   subsequently receiving, by the event management device, in response to a request for access to a website in the enterprise network, at least a second client geographical location based upon a second set of web device profile characteristics gathered by a second beacon executing on the device from which the request was received; and
   in response to detecting a difference between the first and second geographical locations, generating, by the risk assessment device, a risk assessment based upon the difference.

2. The method of claim 1, wherein generating the alert having the associated priority level comprises:
   generating, by the event management device, an alert having a first priority level based upon correlating of the logon event information and the risk assessment when the risk assessment is indicative of a first risk level; and
   generating, by the event management device, an alert having a second priority level, the second priority level being lower than the first priority level, based upon correlating of the logon event information and the risk assessment when the risk assessment is indicative of a second risk level, the second risk level being lower than the first risk level.

3. The method of claim 1, wherein receiving the risk assessment from the risk assessment device comprises receiving, by the event management device, the risk assessment based upon the web device profile characteristic associated with the logon event, the web device profile characteristic identifying a geographic location associated with the client device.

4. The method of claim 1, wherein receiving the risk assessment from the risk assessment device comprises receiving, by the event management device, the risk assessment based upon the web device profile characteristic associated with the logon event, the web device profile characteristic identifying a change in geographic location of the client device between a first logon event associated with the client device and a second logon event associated with the client device.

5. The method of claim 1, wherein receiving the risk assessment from the risk assessment device comprises receiving, by the event management device, the risk assessment based upon the web device profile characteristic associated with the logon event, the web device profile characteristic identifying a computer device asset associated with the client device.

6. The method of claim 1, wherein receiving the risk assessment from the risk assessment device comprises receiving, by the event management device, the risk assessment based upon the web device profile characteristic associated with the logon event, the web device profile characteristic identifying compliance information associated with the client device.

7. The method of claim 1, wherein receiving the risk assessment from the risk assessment device comprises receiving, by the event management device, the risk assessment based upon the web device profile characteristic associated with the logon event, the web device profile characteristic retrieved by a beacon associated with a web page presented to the client device prior to the logon event.

8. The method of claim 1, further comprising:
receiving, by the event management device, web device profile characteristic information from the risk assessment device in response to the logon event associated between the event device and the client device;
comparing, by the event management device, the web device profile characteristic information to entries in an aggregate information database, the aggregate information database including an aggregate of web device profile characteristic information received over time; and
in response to detecting a lack of correspondence between the web device profile characteristic information and the entries in the aggregate information database, generating, by the event management device, a report regarding the client device associated with the received web device profile characteristic information.

9. The method of claim 8, wherein:
receiving web device profile characteristic information from the event device in response to the logon event associated between the event device and the client device comprises receiving, by the event management device, client device asset information from the risk assessment device in response to the logon event associated between the event device and the client device; and
comparing the web device profile characteristic information to entries in the aggregate information database, comprises comparing, by the event management device, the client device asset information with entries in an aggregate asset information portion of the aggregate information database, the aggregate asset information collected over time.

10. The method of claim 8, wherein:
receiving web device profile characteristic information from the event device in response to the logon event associated between the event device and the client device comprises receiving, by the event management device, client device compliance information from the risk assessment device in response to the logon event associated between the event device and the client device; and
comparing the web device profile characteristic information to entries in the aggregate information database, comprises comparing, by the event management device, the client device compliance information with entries in an aggregate compliance information portion of the aggregate information database, the aggregate compliance information collected over time.

11. The method of claim 1 wherein generating the alert having the associated priority level based upon the risk assessment includes:
providing, from the event management device to a security information and event management (SIEM) device, a SIEM alert which includes (i) a priority indicator identifying a level of priority within a predefined priority range, and (ii) a confidence factor indicating whether the SIEM device is permitted to suppress the SIEM alert, the SIEM alert operating as a notification of relative importance of the logon event to security risk of an enterprise network.

12. The method of claim 11 wherein the SIEM alert is provided from the event management device to the SIEM device during a common window of time;
wherein the method further comprises providing, from the event management device to the SIEM device, other SIEM alerts which include respective priority indicators and confidence factors during the common window of time; and
wherein the respective priority indicators of the other SIEM alerts and the priority indicator of the SIEM alert enable the SIEM device to prioritize, for the common window of time, the SIEM alert and the other SIEM alerts in accordance to relative importance to enable an administrator of the SIEM device to attend to potential enterprise network attacks in real time.

13. The method of claim 1 wherein the web device profile characteristic having been gathered by the beacon executing on the client device includes at least one of geographical location, browser version, browser vulnerability, click stream values, client behavior, client device assets, and device compliance information.

14. The method of claim 1, further comprising receiving first client device asset information, in response to the request for access to the enterprise network access device from the client device, and subsequently receiving second client device asset information, in response to the request for access to a website in the enterprise network from the client device, second set of web device profile characteristics gathered by a second beacon executing on the client device.

15. The method of claim 14, further comprising:
generating, by the event management device, an alert having a first priority level based upon correlating of the logon event information and the risk assessment when the risk assessment is indicative of a first risk level;
generating, by the event management device, an alert having a second priority level, the second priority level being lower than the first priority level, based upon correlating of the logon event information and the risk assessment when the risk assessment is indicative of a second risk level, the second risk level being lower than the first risk level;
wherein receiving the risk assessment from the risk assessment device comprises receiving, by the event management device, the risk assessment based upon the web device profile characteristic associated with the logon event, the web device profile characteristic identifying a geographic location associated with the client device;
wherein receiving the risk assessment from the risk assessment device comprises receiving, by the event management device, the risk assessment based upon the web device profile characteristic associated with the logon event, the web device profile characteristic identifying a change in geographic location of the client device between a first logon event associated with the client device and a second logon event associated with the client device;
wherein receiving the risk assessment from the risk assessment device comprises receiving, by the event management device, the risk assessment based upon the web device profile characteristic associated with the logon event, the web device profile characteristic identifying a computer device asset associated with the client device;
wherein receiving the risk assessment from the risk assessment device comprises receiving, by the event management device, the risk assessment based upon the web device profile characteristic associated with the logon event, the web device profile characteristic identifying compliance information associated with the client device; and wherein receiving the risk assessment from the risk assessment device comprises receiving, by the event management device, the risk assessment based upon the web device profile characteristic associated with the logon event, the web device profile characteristic retrieved by a beacon associated with a web page presented to the client device prior to the logon event.

16. An event management device, comprising:
a communications interface;
a controller disposed in electrical communication with the communications interface, the controller configured to:
receive a request for access from a client device;
transmit an authentication webpage to the client including a beacon to retrieve a client device profile characteristic;
receive logon event information from an event device in response to a logon event associated between the event device and the client device, the logon event information including authentication input from the authentication webpage;
receive a risk assessment from a risk assessment device, the risk assessment based upon a web device profile characteristic associated with the logon event, the web device profile characteristic having been gathered by the beacon executing on the client device in the authentication webpage transmitted to the client device;
correlate the logon event information and the risk assessment; and
in response to detecting the logon event as corresponding to an authentication attack, generate an alert having an associated priority level based upon the risk assessment;
wherein when receiving the risk assessment from the risk assessment device the controller is configured to receive the risk assessment based upon the web device profile characteristic associated with the logon event, the web device profile characteristic identifying click stream information associated with a web page accessed by the client device,
wherein the controller is further configured to:
receive, by the event management device, in response to the request for access to an enterprise network access device from a client device, a first client geographical location based upon the web device profile characteristic associated with the logon event gathered by the beacon executing on the client device;
subsequently receive, by the event management device, in response to a request for access to a website in the enterprise network, at least a second client geographical location based upon a second set of web device profile characteristics gathered by a second beacon executing on the device from which the request was received; and
in response to detecting a difference between the first and second geographical locations, generate, by the risk assessment device, a risk assessment based upon the difference.

17. The event management device of claim 16, wherein when generating the alert having the associated priority level, the controller is configured to:
generate an alert having a first priority level based upon correlation of the logon event information and the risk assessment when the risk assessment is indicative of a first risk level; and
generate an alert having a second priority level, the second priority level being lower than the first priority level, based upon correlation of the logon event information and the risk assessment when the risk assessment is indicative of a second risk level, the second risk level being lower than the first risk level.

18. The event management device of claim 16, wherein when receiving the risk assessment from the risk assessment device the controller is configured to receive the risk assessment based upon the web device profile characteristic associated with the logon event, the web device profile characteristic identifying a geographic location associated with the client device.

19. The event management device of claim 16, wherein when receiving the risk assessment from the risk assessment device the controller is configured to receive the risk assessment based upon the web device profile characteristic associated with the logon event, the web device profile characteristic identifying a change in geographic location of the client device between a first logon event associated with the client device and a second logon event associated with the client device.

20. The event management device of claim 16, wherein when receiving the risk assessment from the risk assessment device the controller is configured to receive the risk assessment based upon the web device profile characteristic associated with the logon event, the web device profile characteristic identifying a computer device asset associated with the client device.

21. The event management device of claim 16, wherein when receiving the risk assessment from the risk assessment device the controller is configured to receive the risk assessment based upon the web device profile characteristic associated with the logon event, the web device profile characteristic configured as compliance information associated with the client device.

22. The event management device of claim 16, wherein when receiving the risk assessment from the risk assessment device the controller is configured to receive the risk assessment based upon the web device profile characteristic associated with the logon event, the web device profile characteristic retrieved by a beacon associated with a web page presented to the client device prior to the logon event.

23. A computer program product having a non-transitory computer-readable medium including computer program logic encoded thereon that, when performed on a controller of an event management device causes the event management device to:
receive a request for access from a client device;
transmit, in response to receiving the request, an authentication webpage to the client device, the webpage including a beacon configured to execute on the client device when the webpage is displayed on the client device to retrieve a client device profile characteristic;
receive logon event information in response to a logon event associated between the event device and the client device, the logon event information including authentication input from the authentication webpage;
receive a risk assessment based upon a web device profile characteristic associated with the logon event, the web device profile characteristic having been gathered by the beacon executing on the client device in the authentication webpage transmitted to the client device;
correlate the logon event information and the risk assessment; and
in response to detecting the logon event as corresponding to an authentication attack, generate an alert having an associated priority level based upon the risk assessment;
wherein receiving web device profile characteristic information from the event device in response to the logon event associated between the event device and the client device comprises receiving, by the event management device, click stream information from the risk assessment device in response to the logon event associated between the event device and the client device; and comparing the web device profile characteristic information to entries in the aggregate information database, comprises comparing, by the event management device, the client device click stream information with entries in a known click stream information portion of the aggregate information database, wherein the event management device is further caused to:

receive, by the event management device, in response to the request for access to an enterprise network access device from a client device, a first client geographical location based upon the web device profile characteristic associated with the logon event gathered by the beacon executing on the client device;

subsequently receive, by the event management device, in response to a request for access to a website in the enterprise network, at least a second client geographical location based upon a second set of web device profile characteristics gathered by a second beacon executing on the device from which the request was received; and in response to detecting a difference between the first and second geographical locations, generate, by the risk assessment device, a risk assessment based upon the difference.

* * * * *